United States Patent
Russo

[19]

[11] Patent Number: 5,829,725
[45] Date of Patent: Nov. 3, 1998

[54] GARMENT HANGER BRACKET FOR AUTOMOTIVE GARMENT HANGERS

[76] Inventor: David A. Russo, 8724 Hamilton East Dr., Sterling Heights, Mich. 48313

[21] Appl. No.: 667,408

[22] Filed: Jun. 21, 1996

[51] Int. Cl.⁶ .................................................. F16B 45/00
[52] U.S. Cl. ................................... 248/304; 248/309.2
[58] Field of Search .................................. 248/304, 301, 248/322, 339, 309.2; 224/927, 560, 561; 403/225, 228, 291

[56] References Cited

U.S. PATENT DOCUMENTS

| | | | |
|---|---|---|---|
| D. 321,314 | 11/1991 | Gary | 248/304 X |
| 1,446,781 | 2/1923 | Benson . | |
| 1,930,645 | 10/1933 | Ellis | 248/304 X |
| 2,532,909 | 12/1950 | Hart | 224/927 X |
| 2,711,873 | 6/1955 | Larin | 248/301 X |
| 2,721,680 | 10/1955 | Steckman | 224/560 X |
| 3,002,666 | 10/1961 | Silverman | 224/927 X |
| 3,224,721 | 12/1965 | Malmquist | 248/339 |
| 3,226,147 | 12/1965 | Marshall . | |
| 3,584,772 | 6/1971 | Robertson | 224/927 X |
| 3,708,093 | 1/1973 | Toms, II . | |
| 3,995,822 | 12/1976 | Einhorn et al. . | |
| 4,008,871 | 2/1977 | Rex | 248/304 X |
| 4,098,484 | 7/1978 | Gray | 224/927 X |
| 4,179,148 | 12/1979 | Johnson . | |
| 4,756,498 | 7/1988 | Frye | 248/339 X |
| 4,863,081 | 9/1989 | Gabbert | 224/927 X |
| 4,865,688 | 9/1989 | Ackmann | 224/927 X |
| 5,104,083 | 4/1992 | Shannon | 224/927 X |
| 5,328,068 | 7/1994 | Shannon | 224/927 X |
| 5,373,979 | 12/1994 | Moore | 224/927 X |
| 5,405,067 | 4/1995 | Huges | 224/927 X |
| 5,411,233 | 5/1995 | Grimes, III et al. . | |
| 5,419,067 | 5/1995 | Drummond et al. . | |

FOREIGN PATENT DOCUMENTS 2620781  3/1989  France ................................. 248/339

*Primary Examiner*—Daniel P. Stodola
*Assistant Examiner*—Gregory J. Strimbu
*Attorney, Agent, or Firm*—Peter D. Keefe

[57] ABSTRACT

A garment hanger bracket has an eyelet member and a hook member integrally connected thereto. The eyelet member has an eyelet for receiving thereinto the base and hook portions of an automotive garment hanger. The hook member has an over-sized J-shape configuration. The rear surface of the eyelet member is flat and covered by a backing composed of a foam layer covered by a protective covering, such as mylar, which serves to protect the foam layer from wear. A foam insert is provided within the eyelet of the eyelet member, and is bonded to the foam layer. The foam insert is pivotable with respect to a basal edge portion of the eyelet by the backing being cut along the edge of the eyelet everywhere except the basal edge portion. Alternatively, the foam insert and the backing have a slot-shaped cut-out for snugly receiving an automotive garment hanger.

8 Claims, 2 Drawing Sheets

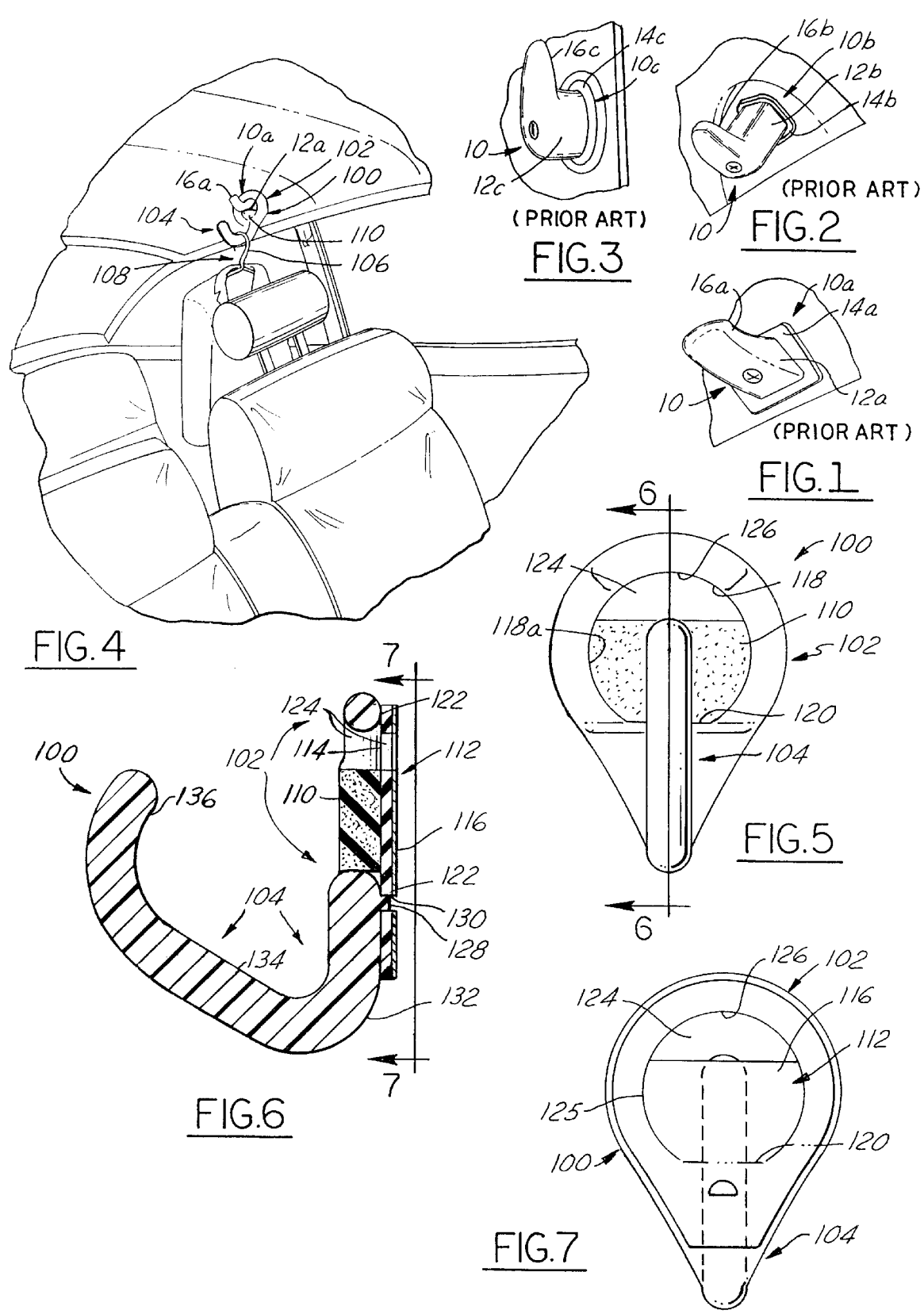

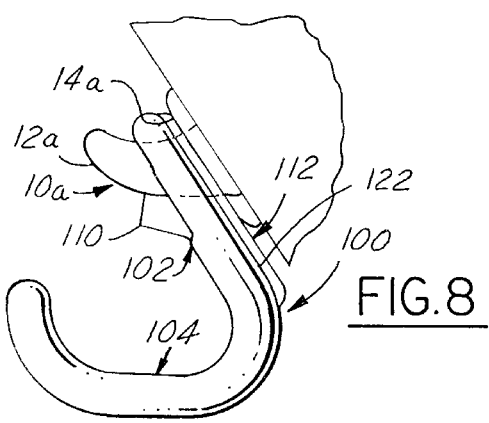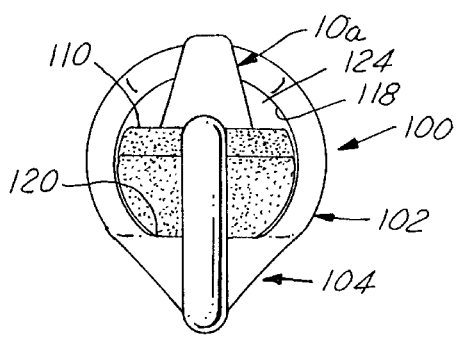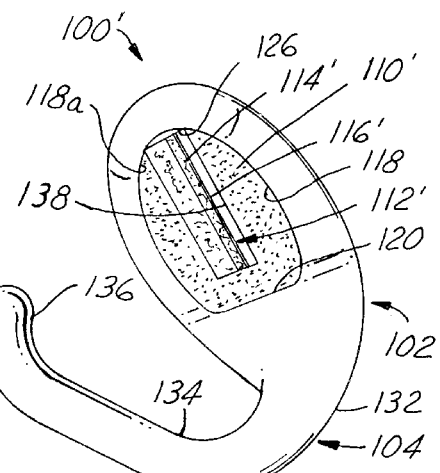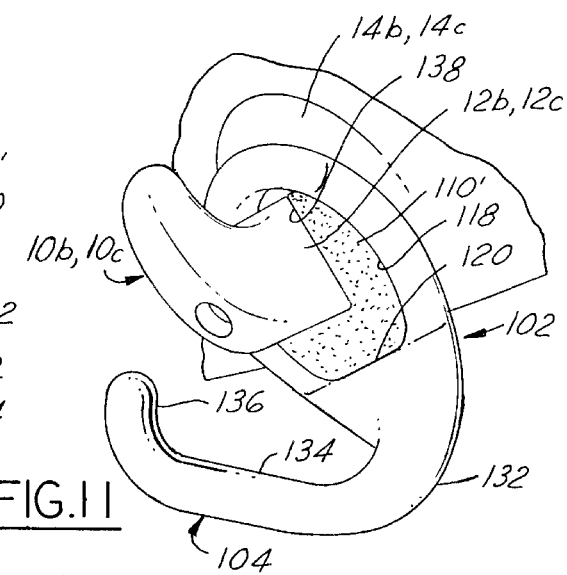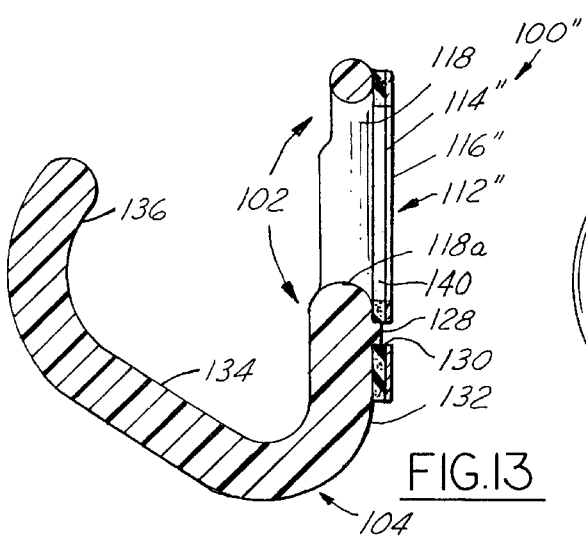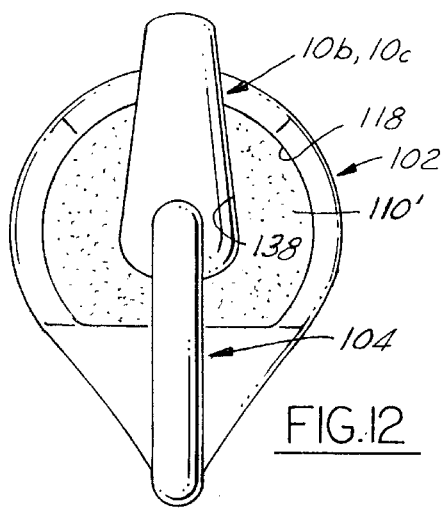

GARMENT HANGER BRACKET FOR AUTOMOTIVE GARMENT HANGERS

BACKGROUND OF THE INVENTION

1. Field of the Invention:

The present invention relates to garment hangers of automotive vehicles. More particularly, the present invention relates to a garment hanger bracket which fits onto an automotive garment hanger for providing an improved garment hanger structure for hangably interfacing with the hook of conventional clothes hangers.

2. Description of the Prior Art:

As depicted by FIGS. 1 through 3, automotive vehicles typically include in the passenger compartment thereof at least one, usually two, automotive garment hangers 10. FIG. 1 depicts a first type of automotive garment hanger 10a typically utilized in the passenger compartment of certain cars, wherein a rather thick base portion 12a projects outwardly from trim 14a and curves upwardly to smoothly become a hook portion 16a. FIG. 2 depicts an automotive garment hanger 10b typically utilized in the passenger compartment of certain other cars, wherein a rather thinner base portion 12b projects from trim 14b and a hook portion 16b projects upwardly from the base portion. Finally, FIG. 3 depicts an automotive garment hanger 10c typically utilized in the passenger compartment (cab) of pick-up trucks, wherein a rather thick base portion 12c projects from trim 14c and a hook portion 16c projects upwardly from the base portion. In operation of any of these automotive garment hangers, the hook of one or more conventional clothes hangers (which, in turn, are used to support garments) is (are) placed onto the base portion and trapped thereon by the hook portion.

While automotive garment hangers are quite useful, especially to travelers on a journey requiring a change of clothing or to those picking up dry cleaning, they are very limited in the number of conventional clothes hangers they can hold at any one time, and further, since they are relatively small, it is somewhat difficult to place the hooks of clothes hangers thereon, and remove them therefrom. Accordingly, what is needed is some way in which the structure of automotive garment hangers may be simply modified to facilitate interfacing with the hook of conventional clothes hangers.

It is known in the prior art to place a garment hanger bracket onto an automotive garment hanger or to otherwise modify an automotive garment hanger to thereby enhance its structural capacity to hold a number of hooks of conventional clothes hangers. Examples of such structures are described in U.S. Pat. Nos. 3,226,147; 3,584,772; 3,708,093; 5,104,083; 5,411,233; and 5,419,067. However, what remains needed in the art is a garment hanger bracket which is easily mounted onto an automotive garment hanger, is very stable in relation thereto and is able to conveniently accommodate many hooks of conventional clothes hangers.

SUMMARY OF THE INVENTION

The present invention is a garment hanger bracket which is easily mounted onto an automotive garment hanger, is very stable in relation thereto and is able to conveniently accommodate many hooks of conventional clothes hangers.

The garment hanger bracket according to the present invention is composed generally of an eyelet member and a hook member integrally connected thereto. The eyelet member has an eyelet for receiving thereinto the base and hook portions of an automotive garment hanger. The hook member has an over-sized J-shape configuration.

In a first preferred embodiment of the garment hanger bracket, the following structural features are provided. The rear surface of the eyelet member is flat and covered by a backing composed of a foam layer covered by a protective covering, such as mylar, which serves to protect the foam layer from wear. A foam insert is provided within the eyelet of the eyelet member, and is bonded to the foam layer. The foam insert is bendable and pivotable with respect to the basal edge portion of the eyelet by the backing being cut along a cut-line generally at the edge of the eyelet everywhere except the basal edge portion of the eyelet. In this regard, a semi-circularly shaped cut-out is formed in the foam insert and the backing opposite the basal edge portion of the eyelet edge for initially receiving therein the hook portion of an automotive garment hanger. The over-sized J-shape of the hook is characterized by a curved segment, an elongated segment, and a hook segment.

In operation of the first preferred embodiment of the garment hanger bracket with respect to an automotive garment hanger of the first type shown in FIG. 1, the eyelet member receives the base and hook portions of the automotive garment hanger so that the backing abuts the trim of the automotive garment hanger and the foam insert is resiliently and compressingly deflected so that the garment hanger bracket is securely and snugly held on the automotive garment hanger without looseness, squirm, wiggle or rattle.

In a second preferred embodiment of the garment hanger bracket, the following structural features are provided. The rear surface of the eyelet member is flat and covered by a backing composed of a foam layer covered by a protective covering, such as mylar, which serves to protect the foam layer from wear. A foam insert is provided within the eyelet of the eyelet member, and is bonded to the foam layer. The foam insert and the backing have a slot shaped cut-out formed therein for snugly receiving an automotive garment hanger of the second and third types depicted in FIGS. 2 and 3. The over-sized J-shape of the hook member is characterized as recounted hereinabove.

In operation of the second preferred embodiment of the garment hanger bracket with respect to an automotive garment hanger of the second or third types, the slot shaped cut-out in the eyelet member receives the base and hook portions of the automotive garment hanger, so that the backing abuts the interior trim adjacent the automotive garment hanger and the foam insert is resiliently compressed so that the garment hanger bracket is securely and snugly held on the automotive garment hanger without looseness, squirm, wiggle or rattle.

The curved segment locates the elongated segment at an acute angle with respect to the rear surface of the eyelet member. In the event the automotive garment hanger and its trim are at an acute angle downwardly with respect to the horizontal (see FIGS. 1 and 2), the rear surface of the eyelet member will be similarly acutely angled when located in abutting relation to the trim. Therefore, since the curved segment places the elongated segment at a similar acute angle with respect to the rear surface of the eyelet member, the elongated segment will be oriented generally horizontally. Accordingly, a large number of clothes hangers may be hooked onto the hook member (primarily at the elongated segment) very easily without bunching and with easy removability.

Accordingly, it is an object of the present invention to provide a garment hanger bracket for an automotive garment hanger which provides for easy hooking thereupon of a number of clothes hangers, wherein the garment hanger bracket securely and snugly seats on the automotive garment hanger without rattling.

It is an additional object of the present invention to provide a garment hanger bracket for an automotive garment hanger which provides for easy hooking thereupon of a number of clothes hangers, wherein the garment hanger bracket securely and snugly seats on the automotive garment hanger by resilient deformation of a foam material.

It is an additional object of the present invention to provide a garment hanger bracket for an automotive garment hanger that securely and snugly seats on the automotive garment hanger by resilient deformation of a foam material, and wherein the hook thereof is characterized by an oversized J-shape which provides easy hooking thereupon of a number of clothes hangers.

These, and additional objects, advantages, features and benefits of the present invention will become apparent from the following specification.

BRIEF DESCRIPTION OF THE DRAWINGS

FIG. 1 is a perspective view of a first type of automotive garment hanger.

FIG. 2 is a perspective view of a second type of automotive garment hanger.

FIG. 3 is a perspective view of a third type of automotive garment hanger.

FIG. 4 is a perspective view of the garment hanger bracket according to a first preferred embodiment thereof, shown in operation with the first type of prior art automotive garment hanger situated in a passenger compartment of a motor vehicle.

FIG. 5 is a front view of the garment hanger bracket according to the first preferred embodiment thereof.

FIG. 6 is a sectional side view of the garment hanger bracket according to the first preferred embodiment thereof, seen along line 6—6 in FIG. 5.

FIG. 7 is a rear view of the garment hanger bracket according to the first preferred embodiment thereof.

FIG. 8 is a side view of the garment hanger bracket according to the first preferred embodiment thereof, shown in operation with the first type of prior art automotive garment hanger.

FIG. 9 is a front view of the garment hanger bracket according to the first preferred embodiment thereof, shown in operation with the first type of prior art automotive garment hanger.

FIG. 10 is a perspective view of the garment hanger bracket according to a second preferred embodiment thereof.

FIG. 11 is a perspective view of the garment hanger bracket according to the second preferred embodiment thereof, shown in operation with the second type of prior art automotive garment hanger.

FIG. 12 is a front view of the garment hanger bracket according to the second preferred embodiment thereof, shown in operation with the second type of prior art automotive garment hanger.

FIG. 13 is a side view of the garment hanger bracket according to a third preferred embodiment thereof.

DETAILED DESCRIPTION OF THE PREFERRED EMBODIMENT

Referring now to the Drawing, FIG. 4 shows an automotive garment hook bracket 100 according to a first preferred embodiment thereof for primary use with a first type of prior art automotive garment hanger 10a, as depicted in FIG. 1. The automotive garment hanger bracket 100 has an eyelet member 102 which receives the hook and base portions 12a, 16a of the automotive garment hanger 10a so as to be hooked thereupon. Integrally connected with the eyelet member 102, preferably via a tapering, is a hook member 104, preferably having a generally cylindrical cross-section. The hook member 104 is intended to hold thereon the hook 106 of conventional clothes hangers 108, as generally shown in FIG. 4. As can be further appreciated from reference to FIG. 4, it is clearly very much easier for the hook 106 of the clothes hanger 108 to be placed upon the hook member 104 of the automotive garment hanger bracket 100 than would be possible with respect to the automotive garment hanger 10a, itself, directly. It will also be immediately appreciated that a large number of hooks 106 of clothes hangers 108 can be accommodated by the hook member 104 in that it is structurally characterized by an oversized J-shape, a feature not possible with the automotive garment hanger 10a itself.

The automotive garment bracket 100 is securely and snugly located with respect to the automotive garment bracket 10a via operation of a foam insert 110 and a backing 112 (see FIG. 6) composed of a foam layer 114 and a protective covering 116.

The structure and function of the automotive garment bracket 100 will be discussed with greater specificity with reference additionally being had to FIGS. 5 through 9.

The eyelet and hook portions 102, 104 of the garment hanger bracket 100 are integrally formed, preferably of plastic material by an injection molding process. It is preferred for the surfaces thereof to be smoothly rounded, except for the rear surface of the eyelet member, which is preferably flat.

As shown by FIG. 5, the eyelet member 102 has preferably a substantially circular shape, wherein an eyelet 118 is provided therein. The eyelet 118 has an edge 118a which follows generally the circular contour of the eyelet member 102, but preferably has a straight basal edge portion 120 adjacent the hook member 104 to thereby provide structural strength at the joinder of the hook member with the eyelet member.

As best seen in FIG. 6, the rear surface 122 of the eyelet member 102 is flat. The foam layer 114 of the backing 112 is attached to the rear surface 122, such as for example by an adhesive, and is shaped to conformably cover the rear surface (see FIG. 7). The foam layer 114 is covered. (see FIG. 7) by the aforementioned protective covering 116, which is attached thereto such as for example by an adhesive. It is preferred to provide a semi-circularly shaped cut-out 124 at the superior edge portion 126 of the edge 118a of the eyelet 118 (which is located, as shown, opposite the basal edge portion 120) to thereby provide an entry location for the hook portion 16a of the automotive garment hanger 10a. The semi-circularly shaped cut-out 124 can occupy a smaller or larger portion of the area of the eyelet 118 than that shown in FIG. 5 depending on the shape of the automotive garment hanger it is intended to interface with. As shown in FIG. 7, the backing is cut along a cut-line 125 conformably along the edge 118a of the eyelet 118 except at the basal edge portion 120. It is preferred for ease and accuracy of placement of the backing 112 onto the rear surface 122, that an alignment boss 128 be provided on the rear surface which is received by an alignment aperture 130 provided in the backing (see FIG. 6).

The aforementioned foam insert 110 is configured to conformably fit into the eyelet 118, wherein the foam insert is truncated at the hemispherically shaped cut-out 124 (see FIG. 6). The foam insert 110 is attached to the foam layer 114, such as for example by an adhesive. Accordingly, the foam insert 110 is pivotable with the backing at the basal edge portion 120.

A preferred adhesive used in the practice of the present invention is a polyester supported laminating adhesive, such as product C-690B-14PT of JDC, Inc. of Mount Juliet, Tenn. 37122. A preferred foam for the foam insert 110 and foam layer 114 is a multipurpose FP polymer foam, such as product A-05031 available through Monarch Rubber of Spencer, W. Va. A preferred protective covering 116 is an acrylic mylar, such as product CF-0029 of Morgan Adhesives Co. (MACtac) of Stow, Ohio 44224.

As shown best by FIG. 6, the hook member 104 has an over sized J-shape which is structurally characterized by: a curved segment 132 adjacent the eyelet member 102, an elongated segment 134, and a hook segment 136 which curves upwardly in relation to the elongated segment so as to hold hooks of clothes hangers at the elongated segment. The curved segment 132 provides more than a ninety degree bend, so that the elongated segment 134 is acutely angled in relation to the rear surface 122 of the eyelet member 102.

Operation of the garment hanger bracket 100 will now be detailed with reference being directed to FIGS. 1, 8 and 9.

The user grasps the garment hanger bracket 100 so that the rear surface 122 faces the automotive garment hanger 10a, and then causes the hook portion 16a thereof to thrust into the eyelet 118 through the semi-circularly shaped cut-out 124. This thrusting continues until, as shown, the base portion 12a of the automotive garment hanger 10a is received into the eyelet, whereupon the backing 112 rests against the trim 14a of the automotive garment hanger. It will be noted that the foam insert 110 has been resiliently compressed by being bendably deflected out of the eyelet starting from the basal edge portion 120 to the semi-circularly shaped cutout 124. This deflection of the foam insert applies resilient pressure to the automotive garment hanger, which in turn causes the garment hanger bracket to be snugly, securely and firmly held in place on the automotive garment hanger without looseness, squirm, wiggle or rattle.

The curved segment 132 places the elongated segment 134 at an acute angle with respect to the rear surface 122 of the eyelet member 102. In the event the automotive garment hanger 10a and its trim are at an acute angle downwardly with respect to the horizontal (see FIGS. 1 and 4), the rear surface of the eyelet member will be similarly acutely angled when located in abutting relation to the trim. Therefore, since the curved segment places the elongated segment at a similar acute angle with respect to the rear surface of the eyelet member, the elongated segment will be oriented generally horizontally (see FIG. 8). Accordingly, a large number of clothes hangers may be hooked onto the hook member (primarily at the elongated segment) very easily without bunching and with easy removabilty. It should be noted in this regard, that the hook segment will have generally a vertical orientation when the elongated segment is horizontally oriented.

Referring now to FIGS. 10 through 12, a second preferred embodiment of the garment hanger bracket 100' will be described, wherein like structured and functioning components have like numeral designations. In this regard, the eyelet and hook members 102, 104 are structured and function as hereinabove described with respect to the first preferred embodiment, so that no further discussion is warranted.

The backing 112' includes a foam layer 114' and a protective covering 116' as hereinabove discussed. A foam insert 110' is attached to the foam layer 114'. These components are structurally as hereinabove described, except that rather than a semi-circularly shaped cut-out there is now a slot shaped cut-out 138 which runs from the superior edge portion 126 of the edge 118a of the eyelet 118 to near, but spaced from, the basal edge portion 120. There is no cut-line in the backing 112'. The slot shaped cut-out 138 is dimensioned to interface primarily with the second or third type of prior art automotive garment hanger 10b, 10c (see FIG. 2 and 3), wherein the hook and base portions thereof are thrust into the eyelet 118 through the slot shaped cut-out 138. The dimension of the slot shaped cut-out 138 may be varied to best suit a particular automotive garment hanger structure.

In operation of the garment hanger bracket 100' will now be detailed with reference being directed to FIGS. 11 and 12.

The user grasps the garment hanger bracket 100' so that the flat rear surface faces the automotive garment hanger 10b, 10c and then causes the hook portion thereof to thrust into the eyelet 118 through the slot shaped cut-out 138. This thrusting continues until, as shown, the base portion 12b, 12c of the automotive garment hanger is received into the eyelet, whereupon the backing 112' rests against the trim 14b, 14c of the automotive garment bracket. It will be noted that the foam insert 110' has been resiliently compressed by the base portion of the automotive garment hanger, which applies resilient pressure to the automotive garment hanger, which in turn causes the garment hanger bracket to be snugly, securely and firmly held in place on the automotive garment hanger without looseness, squirm, wiggle or rattle.

Again, provided the automotive garment hanger and its trim are at an acute angle downwardly with respect to the horizontal, the rear surface of the eyelet member will be similarly acutely angled, and the elongated segment will be oriented generally horizontally (see FIG. 11).

Referring now to FIG. 13, a third preferred embodiment of the garment hanger bracket 100" will be described, wherein like structured and functioning components have like numeral designations. In this regard, the eyelet and hook members 102, 104 are structured and function as hereinabove described with respect to the first preferred embodiment, so that no further discussion is warranted.

The backing 112" includes a foam layer 114" and a protective covering 116" as hereinabove discussed. These components are structurally as hereinabove described, except that rather the backing 112" is cut along a cut-line all along the edge 118a of the eyelet 118 to form an eyelet cut-out 140. The eyelet sized cut-out 140 is dimensioned to interface primarily with the third type of prior art automotive garment hanger 10c (see FIG. 3), wherein the hook and base portions thereof are received into the eyelet 118. There is no foam insert.

In operation of the garment hanger bracket 100" is as hereinabove recounted, with the exception that there is no resilient compression of an insert foam. It should be noted that the cut-out of the backing may be other than eyelet sized for resiliently interfacing with an automotive garment hanger.

A dimensional example of the garment hanger bracket 100 now will be given for illustrative, nonlimiting purposes. The eyelet member has a cross-section of about 50 mm, while the eyelet thereof has a cross-section of about 40 mm. The elongated segment of the hook member is about 50 mm long, cylindrically shaped having a cross-section of about 10 mm and the axial centerline thereof is angled, via the curved segment, at about 65 degrees with respect to the rear surface of the eyelet member, and the hook segment is angled at about 90 degrees with respect to the elongated member. The insert foam is about 8 mm thick, the foam layer is about 3 mm thick, and the protective covering is very thin (paper-like thinness). As depicted in FIG. 6, the garment hanger bracket 100 preferably has increasing thicknesses opposite the rear surface, in two stages, for strength. The eyelet member has a thickness of about 7 mm adjacent the superior edge portion of the eyelet, which increases to about 8 mm at a first stage spaced from, but near to, the superior edge portion, then increases to about 10 mm at a second stage near the basal edge portion.

Based upon the hereinabove recounted disclosure, those of ordinary skill will be capable of modifying the detailed exemplary preferred embodiments to thereby best interface with other shaped automotive garment hangers. For example, the shape of the eyelet, the shape of the cut-out, the inclusion and/or shape of the foam insert may be modified as needed for a best interfacing with a selected automotive garment hanger to thereby provide a snug and secure fit therewith.

To those skilled in the art to which this invention appertains, the above described preferred embodiment may be subject to change or modification. For example, the hook member may be configured other than as described shown in the Drawing and the rear surface may not be flat. Such change or modification can be carried out without departing from the scope of the invention, which is intended to be limited only by the scope of the appended claims.

What is claimed is:

1. A garment hanger bracket for hookingly interfacing with an automotive garment hanger, comprising:

an eyelet member having an eyelet for receiving therein a portion of the automotive garment hanger;

a hook member integrally connected with said eyelet member, said hook member comprising a curved segment adjacent said eyelet member, a hook segment, and an elongated segment between said curved segment and said hook segment, wherein said hook member terminates at a distal end of said hook segment, said distal end being openly spaced from said eyelet member; wherein said eyelet has an edge including a basal edge portion adjacent said hook member and an opposite superior edge portion; and a foam insert located in said eyelet, said foam insert being unattached to said superior edge portion of said edge of said eyelet and connected with said hook member adjacent said basal edge portion of said eyelet;

wherein said eyelet member has a rear surface, said rear surface being adjacent said curved segment; and wherein said curved segment locates said elongated segment at an acute angle with respect to said rear surface.

2. The garment hanger bracket of claim 1, further comprising a backing attached to said rear surface, said backing comprising:

a foam layer attached to said rear surface; and a protective covering attached to said foam layer opposite said rear surface.

3. The garment hanger bracket of claim 2, wherein said foam insert is attached to said foam layer.

4. The garment hanger bracket of claim 3, wherein said backing is cut at a cut-line substantially along said edge except said basal edge portion.

5. The garment hanger bracket of claim 4, wherein said backing and said foam insert are provided with a cut-out.

6. The garment hanger bracket of claim 5, wherein said cut-out is substantially semi-circularly shaped and located adjacent said superior edge portion of said eyelet.

7. The garment hanger bracket of claim 3, said backing and said foam insert are provided with a cut-out.

8. The garment hanger bracket of claim 7, wherein said cut-out is substantially slot shaped, said cut-out extending from said superior edge portion of said eyelet to a location selectively near said basal edge portion of said eyelet.

\* \* \* \* \*